United States Patent [19]

Passerini et al.

[11] Patent Number: 5,307,201
[45] Date of Patent: Apr. 26, 1994

[54] ELECTRODE OF NICKEL OXIDE INTERCALATED WITH LITHIUM IONS AND ELECTROCHROMIC DEVICES WHICH INCORPORATE SUCH AN ELECTRODE

[75] Inventors: Stefano Passerini; Lucio De Angelis, both of Rome, Italy

[73] Assignee: Eniricerche S.p.A., Milan, Italy

[21] Appl. No.: 879,178

[22] Filed: May 5, 1992

[30] Foreign Application Priority Data

May 8, 1991 [IT]  Italy ............................. 91 A/001257

[51] Int. Cl.$^5$ .................... G02F 1/153; G02F 1/155
[52] U.S. Cl. .................................. 359/270; 359/265; 359/266; 359/274
[58] Field of Search ............... 359/265, 270, 269, 273, 359/275, 266, 274

[56] References Cited

U.S. PATENT DOCUMENTS 4,386,040 5/1983 Baumgartner et al. .
4,889,414 12/1989 Rauh et al. .

OTHER PUBLICATIONS

S. Passerini et al.-"The Intercalation of Lithium in Nickel Oxide and its Electrochromic Properties"-Journal of the Electrochemical Society, vol. 137, Oct. 10, 1990, pp. 3297-3300.
Canon, Patent Abstracts of Japan-Production of Total Solid State Electrochromic Element, Oct. 12, 1984; and JP-A-59-105618, Jun. 19, 1984.
Patent Abstracts of Japan-Manufacture of Electrode for Solid Electrolyte Type Fuel Cell, vol. 14, No. 273, Jun. 13, 1990, and JP-A-2 087 470 (Mar. 28, 1990).

*Primary Examiner*—Loha Ben
*Assistant Examiner*—Evelyn A. Lester
*Attorney, Agent, or Firm*—Shea & Gould

[57] ABSTRACT

An electrode of nickel oxide intercalated with lithium ions, is obtained by:

thermally evaporating, under vacuum, nickel oxide ($Ni_2O_3$) and depositing on a conductive glass substrate a film of nickel oxide in which the atomic ratio of nickel to oxygen is comprised within the range of from 0.7:1 to 0.9:1, up to a thickness of the order of 100 nm; and activating the thin film of nickel oxide by electrochemical intercalation of an amount of lithium ions, which corresponds to a charge level of from 100 to 1,000 $C/m^2$. An electrochromic window is disclosed, which comprises:

(a) an electrode of tungsten oxide ($WO_3$) on a transparent, conductive glass sheet; and
(b) an electrode of nickel oxide activated by electrochemical intercalation of lithium metal, on a transparent, conductive glass sheet;
(c) an electrolyte interposed between the (a) electrode and the (b) electrode;

wherein the nickel oxide electrode was obtained as said hereinabove.

11 Claims, 3 Drawing Sheets

ELECTRODE OF NICKEL OXIDE INTERCALATED WITH LITHIUM IONS AND ELECTROCHROMIC DEVICES WHICH INCORPORATE SUCH AN ELECTRODE

BACKGROUND OF THE INVENTION

The present invention relates to an electrode of nickel oxide intercalated with lithium, and to the electrochromic devices which incorporate such an electrode, in particular an electrochromic window.

Optical devices which, following the application of an electric signal, are capable of switching from a condition of maximum transparency into the opposite condition of minimal transmittance, and vice-versa, are known in the art. These devices are considerably interesting from the viewpoint of energy saving, in the field of building industry (smart window) and in automobile industry.

In these devices, the optical modulation can be suitably induced by electrochemical way by means of the use of electrochromic materials. By "electrochromic materials", those compounds are meant which are capable of undergoing reversible changes in colour following suitable electrochemical processes. A typical example for such materials is tungsten oxide, $WO_3$, which turns from transparent into blue-coloured owing to an electrochemical intercalation process of the type:

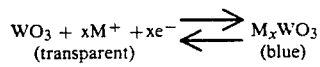
$$WO_3 + xM^+ + xe^- \rightleftarrows M_xWO_3$$
(transparent) (blue)

which is carried out in a cell containing a transparent electrolyte capable of supplying the intercalating ion $M^+$ (normally, an alkali metal ion). If the cell contains another, optically passive, material (i.e., a material which is transparent irrespective of whether the signal applied to it is an anodic or a cathodic one), or a material which is electrochromic with complementary characteristics to $WO_3$, a device is obtained which, when a signal (e.g. a cathodic signal) is applied to it, becomes of dark colour (owing to the formation of blue-coloured $M_xWO_3$), whilst, when the opposite signal (i.e., an anodic signal) is applied to it, turns back into transparent (owing to the restoration of light-coloured $WO_3$). Therefore, by the application of a square-wave signal, the optical transparency of the device can be modulated, with said device being hence given the characteristics of an electrochromic window, with such important technological implications as briefly mentioned hereinabove. For this prior art, reference is made in particular to the paper by B. Scrosati in Chimicaoggi, June 1989, pages 41–45.

In European Patent Application Publication No. 0 454 240 published Oct. 30, 1991, which claims priority to Italian application No. 20.127 A/90 filed Apr. 24, 1990, to the same Applicant's name, an electrochromic window is disclosed, which contains a solid electrolyte consisting of a lithium salt in a crosslinked polyether. Said electrochromic window is endowed with improved values of low-temperature conductivity and transparency.

In European Patent Application Publication No. 0 461 685 published Dec. 18, 1991, which claims priority to Italian application No. 20.632 A/90 filed Jun. 13, 1990, to the same Applicant's name, an electrochromic window is disclosed, which contains a solid electrolyte formed by a lithium salt in a polyepoxide. Such a window is endowed with improved values of transmittance change rate.

SUMMARY OF THE INVENTION

In the sector to which the present invention is directed, a continuous need for improvements exists, due to application reasons, and, according to the present invention, it was found that a particular electrode of oxide of nickel intercalated with lithium ions, is capable of unexpectedly improving the values of transmittance change, unterstood as the difference between the status of maximal transparency and the status of minimal transparency, in those electrochromic devices in which said electrode is incorporated.

Figure 6:
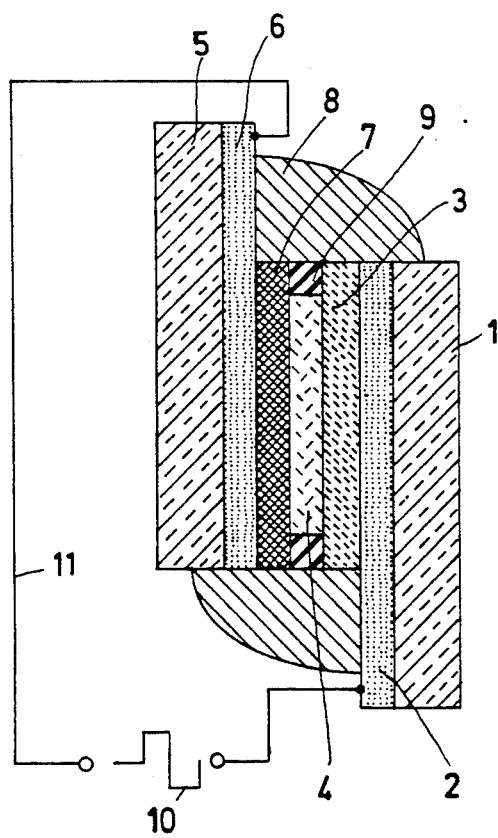

FIG. 6 shows a practical embodiment of an electrochromic window of the present invention. The working electrode is a glass support (1) which bears a layer (2) of tin and indium oxide onto which a layer (3) of tungsten oxide is deposited. The counterelectrode is a glass support (5) which bears a layer (6) of tin and indium oxide onto which a layer (7) of nickel oxide activated by intercalation with lithium is deposited. The electrolyte, sealant, and spaces are (4), (8), and (9). A line (11) connects a voltage source (10) with two terminals connected with the conductive layer of the working electrode ($WO_3$) and counterelectrode ($NIO_x$).

DESCRIPTION OF THE PREFERRED EMBODIMENTS

In accordance therewith, in a first aspect thereof, the present invention relates to an electrode of nickel oxide intercalated with lithium ions, obtained by:

thermally evaporating, under vacuum, nickel oxide ($Ni_2O_3$) and depositing on a conductive glass substrate a film of nickel oxide in which the atomic ratio of nickel to oxygen is comprised within the range of from 0.7:1 to 0.9:1, up to a thickness of the order of 100 nm; and activating said thin film of nickel oxide by means of the electrochemical intercalation of an amount of lithium ions, which corresponds to a charge level of from 100 to 1,000 $C/m^2$.

In particular, according to the present invention, the thin film of nickel oxide is deposited on the conductive glass substrate by thermal evaporation under vacuum (i.e., under a residual pressure of approximately at $10^{-4}$ Pa), at a temperature of about 2,300° K., of a nickel oxide powder ($Ni_2O_3$). Under these conditions, a deposition rate of nickel oxide on the glass substrate of the order of 0.1 nm/s is obtained, and the deposition is continued until a film thickness of the order of 100 nm is obtained. The deposited nickel oxide shows a stoichiometry $NiO_x$, which is variable as a function of the deposition conditions, but, in any case, the atomic ratio of nickel to oxygen is generally comprised within the range of from 0.7:1 to 0.9:1, as determined on the basis of measurements of in-depth composition profile carried out by electronic spectroscopy (Auger effect), with those sensibility coefficients being applied which are reported in "Handbook of Auger Electron Spectroscopy", update 1976.

The electrochemical intercalation of lithium for the activation of nickel oxide is advantageously carried out in a double-electrode cell, and, more particularly, a working electrode, constituted by the thin film of nickel oxide deposited on the conductive glass, and a counter-electrode constituted by a thin film of nickel oxide deposited on the conductive glass, and a counter-electrode constituted by a thin foil of lithium metal. As the electrolyte, a solution of lithium perchlorate in propylene carbonate is advantageously used. The electrolyte is prepared by dissolving lithium perchlorate, purified by vacuum melting, in propylene carbonate, distilled under vacuum.

The preparation is carried out in dry-box. The intercalation process is carried out in dry-box, in an argon environment and in the absence of moisture (water content lower than about 10 ppm), by applying a cathodic current between the working electrode (nickel oxide) and the counter-electrode (lithium foil), for a predetermined time period. The applied current intensity may range between 20 mA/m$^2$ and 200 mA/m$^2$, for such a time period as to obtain an amount of intercalated lithium ions, which corresponds to a charge level of from 100 to 1,000 C/m$^2$.

Figure 1:
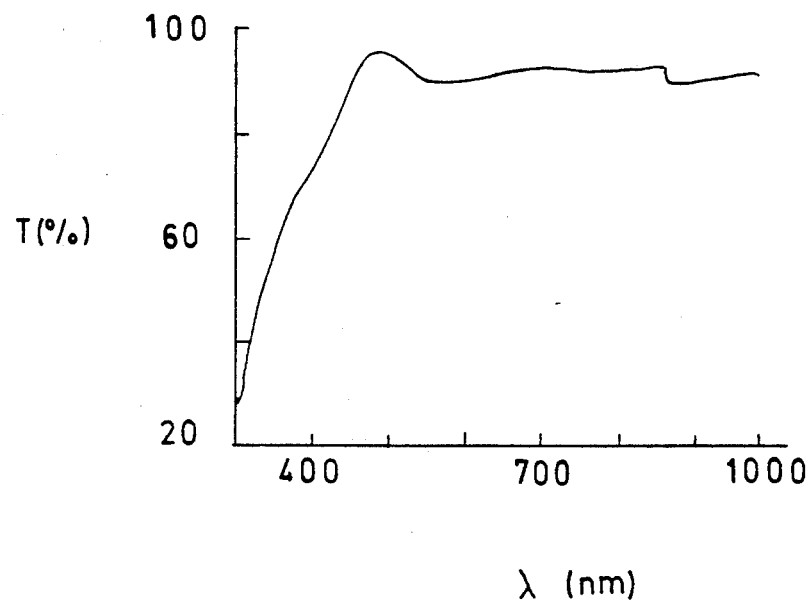
FIG. 1 shows an absorption spectrum in the region of from 300 to 1000 nm for nickel oxide thermally evaporated at about 2300° K. and about $10^{-4}$ Pa and deposited up to a thickness of 100 nm on conductive glass.

According to a form of practical embodiment, nickel oxide is submitted to thermal evaporation by operating at a temperature of about 2,300° K. and under a pressure of about $10^{-4}$ Pa, and is deposited on the conductive glass, up to a thickness of 100 nm. The nickel oxide film deposited in that way, shows an absorption spectrum in the region of from 300 to 1,000 nm, as reported in FIG. 1.

Figure 2:
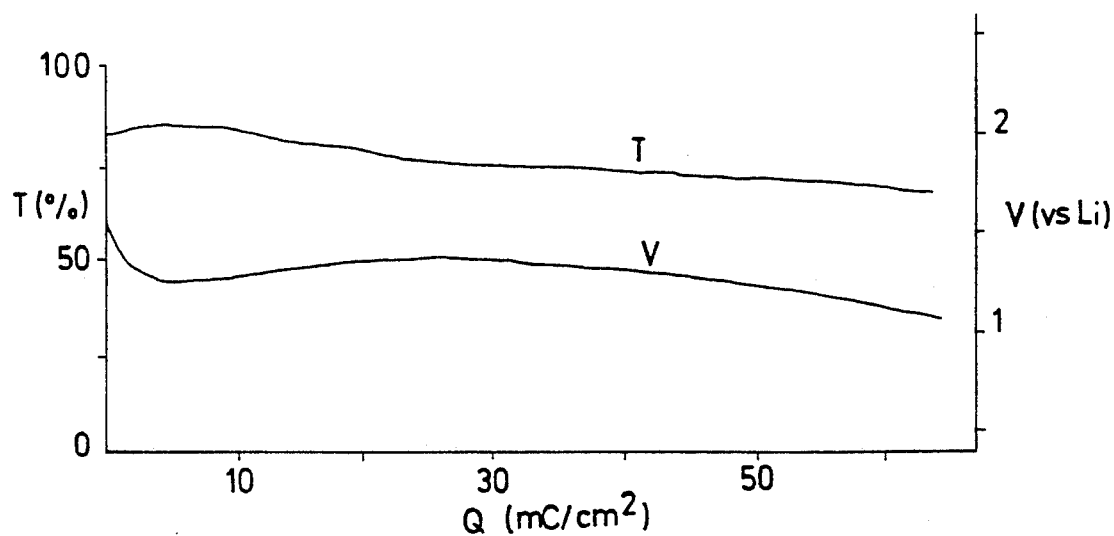
FIG. 2 shows the decrease in transmittance for the above deposited, lithium ion intercalated nickel oxide film as the amount of lithium introduced into the sample increases.

Furthermore, this nickel oxide is submitted to intercalation, according to such modalities as reported hereinabove, up to a charge value of 600 C/m$^2$. During the intercalation, the voltage at the working electrode varies from an initial value of approximately 3.5 V, up to an end value of 1.0–1.2 V, and the transmittance at the wavelength of 563 nm varies from about 90%, down to about 60%. In this intercalation, the electrochromic behaviour is of cathodic type, i.e., the transmittance of the sample decreases as the amount of lithium introduced in said sample increases (see FIG. 2).

The electrochromic behaviour of the activated nickel oxide electrode can be suitably characterized by using a three-electrode cell, in which the working electrode is constituted by the thin film of activated nickel oxide as disclosed hereinabove, and the counter-electrode and the reference electrode are constituted by two foils of lithium metal. The electrolyte used is constituted by a solution of lithium perchlorate in propylene carbonate, the preparation of which is disclosed hereinabove. The change in transmittance of the working electrode, of activated nickel oxide, can be suitably piloted by means of a modulated square-wave signal of from 1.2 volts to 4 volts. During the cathodic impulse (1.2 V), the electrode is clear (intercalation of lithium in nickel oxide) and its transmittance is high, whilst during the anodic impulse (4 V) (lithium de-intercalation), the electrode is dark, and its transmittance is decreased. This behaviour, which is at all reversible, and can be repeated a very large number of times, is associated with the following electro-chemical process:

$$Li_y + wNiO_x \rightleftharpoons Li_wNiO_x + yLi^+ + ye^-$$

Figure 3:
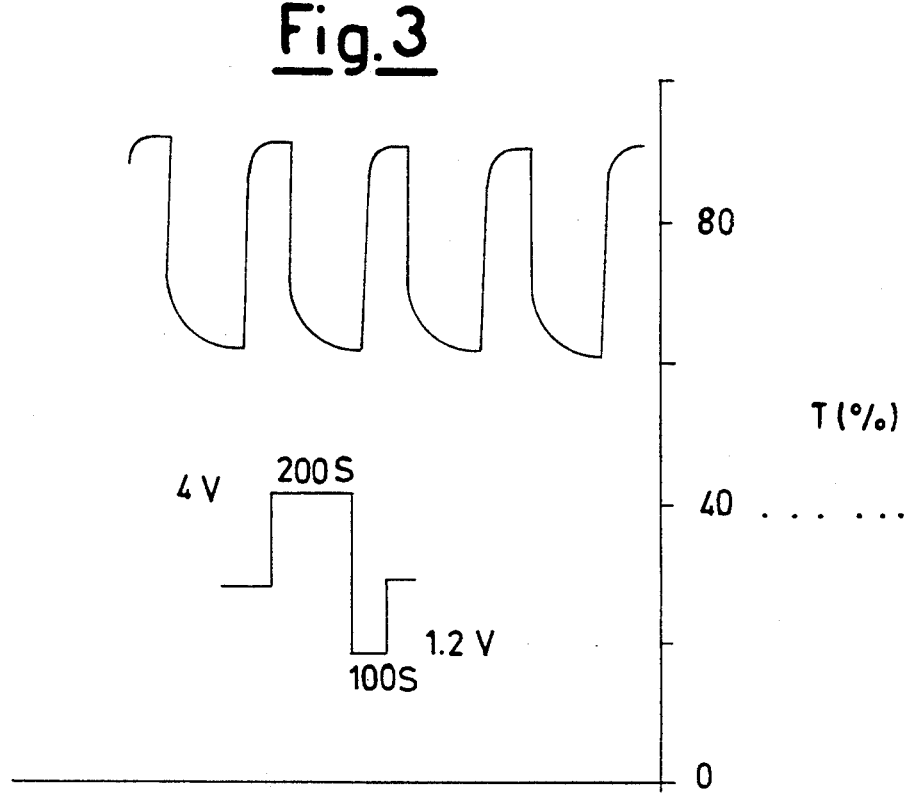
FIG. 3 shows the change in the transmittance at 563 nm of the activated nickel oxide working electrode during cathodic and anodic impulses. It also provides a schematic representation of the electrical piloting impulse.

The trend of the transmittance at 563 nm of the electrode of activated nickel oxide is shown in FIG. 3 of the accompanying drawing tables, together with the schematic representation of the electrical piloting impulse.

Figure 4:
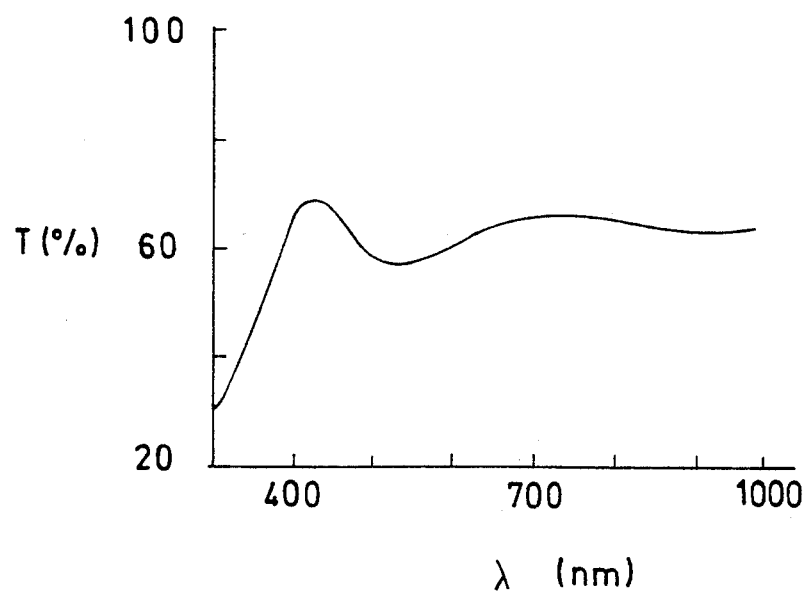
FIG. 4 shows the absorption spectrum in the region of from 300 to 1000 nm of a comparison electrochromic electrode which is similar to the activated nickel oxide electrode of FIG. 3 except that the nickel oxide layer is deposited by a traditional sputtering technique.
Figure 5:
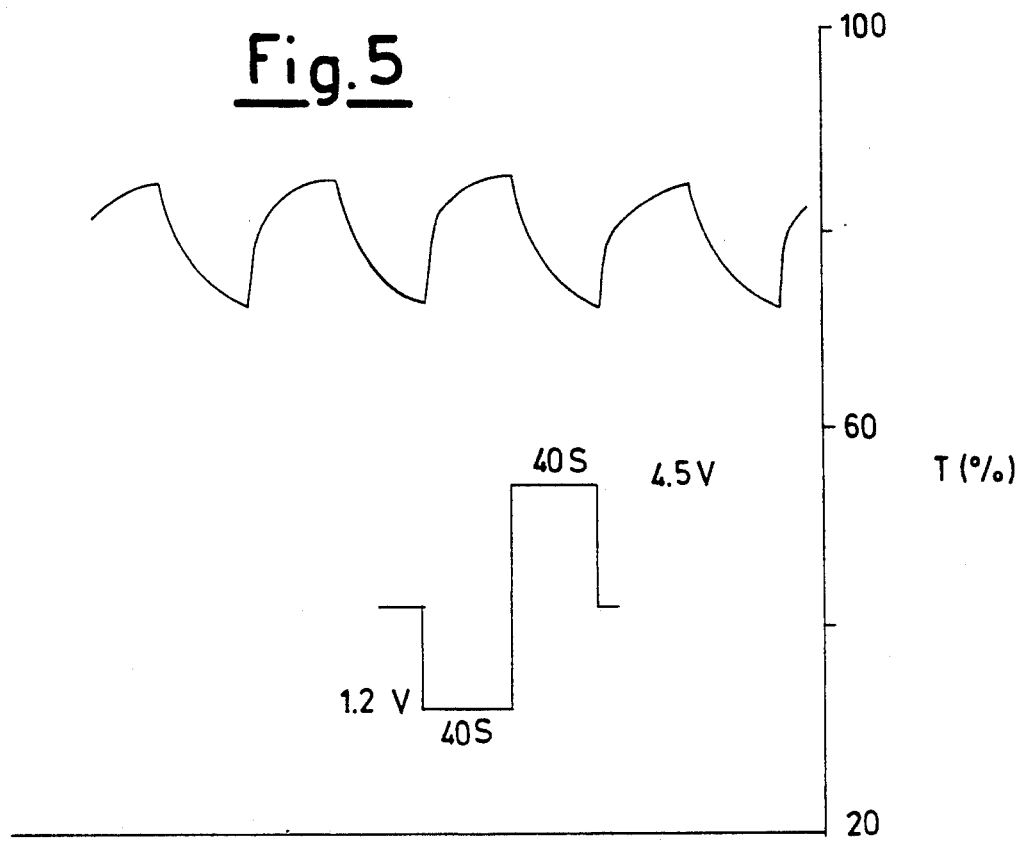
FIG. 5 shows the trend observed when a square wave signal of from 1.2 to 4 volts is applied to the comparative electrode of FIG. 3.

For comparison purposes, an electrochromic electrode is preferred, which is similar to the preceding one, but with its layer of nickel oxide being deposited by the traditional sputtering technique. The so deposited nickel oxide shows an absorption spectrum in the region of from 300 to 1,000 nm, as reported in FIG. 4 of the accompanying drawing tables. When to this electrode a square-wave signal of from 1.2 to 4 V is applied, a trend is obtained, which is as reported in FIG. 5. By comparing the trends shown in FIGS. 3 and 5, one may observe that the maximal change in transmittance which can be obtained (as defined as the difference between the two statuses, of maximal and minimal transparency), is much higher in the case of the electrochromic electrode constituted by evaporation-deposited nickel oxide, than in the case of the electrode constituted by sputtering-deposited nickel oxide.

According to another aspect thereof, the present invention relates to the electrochromic devices which incorporate the electrode of nickel oxide intercalated with lithium, as disclosed hereinabove.

According to a particular aspect thereof, the present invention relates to an electrochromic window comprising:

(a) an electrode of tungsten oxide ($WO_3$) on a transparent, conductive glass sheet, bearing on its inner face a layer of a conductive material of tin oxide or tin and indium oxides;

(b) an electrode of nickel oxide ($NiO_x$; with x comprised within the range of from 0.7 to 0.9), activated by intercalation of lithium metal, on a transparent, conductive glass sheet, bearing on its inner face a layer of a conductive material of tin oxide or tin and indium oxides;

(c) an electrolyte interposed between said (a) electrode and said (b) electrode;

wherein said (b) electrode was obtained as said hereinabove.

In the electrochromic window according to the present invention, the electrode of tungsten oxide can be prepared, according to technologies known from the prior art, by depositing a thin layer of tungsten oxide ($WO_3$) on a glass sheet made conductive by means of a film of tin oxide, or of tin and indium oxides. The layer of tungsten oxide will typically have a thickness of the order of 300 nm. The conductive glasses are products available from the market.

In the electrochromic window according to the present invention, the electrolyte can be either a liquid electrolyte, in particular a solution of a lithium salt in an organic solvent, such as dimethyl sulfide, nitromethane, sulfolane or propylene carbonate, or a solid polymeric electrolyte, i.e., a complex of a lithium salt with poly-(ethylene oxide), or, preferably, with a crosslinked polyether, or a polyepoxide.

The ionic compounds of lithium can be advantageously selected from the group consisting of lithium perchlorate, borate, fluoroborate, thiocyanate, hexafluoroarsenate, trifluoroacetate and trifluoromethanesulphonate. Lithium perchlorate is preferred.

When a solid, polymeric electrolyte is used, the atomic ratio of oxygen contained in said polymer, to lithium contained in said ionic compound may be comprised within the range of from 6:1 to 24:1, and preferably is of the order of 14:1.

In FIG. 6 of the accompanying drawing tables a typical form of practical embodiment is shown of the window according to the present invention. In particular, in this Figure:

- with (1) the glass support is indicated, which bears the layer (2) of tin and indium oxide, onto which a layer (3) of tungsten oxide (having a thickness of approximately 300 nm) was deposited by sputtering;
- with (4) the electrolyte is indicated
- with (5) the glass support is indicated, which bears the layer (6) of tin and indium oxide, onto which a layer (7) of nickel oxide, activated by intercalation with lithium, was deposited;
- with (8) a sealant is indicated; with (9) a spacer is indicated; with (10) an external generator of square-wave voltage is indicated; and with (11) the line is indicated, which connects the voltage source (10) with two terminals connected with the conductive layer of the working electrode ($WO_3$) and of the counterelectrode ($NiO_x$).

The electrochromic window can be suitably piloted by a square-wave signal of from $-2$ volts to $+2$ volts. During the negative impulse (cathodic $WO_3$), the window is dark (intercalation of lithium in $WO_3$ and deintercalation of nickel oxide) and its transmittance is low, whilst during the following positive impulse (anodic $WO_3$), the window turns back into transparent (deintercalation of lithium from $WO_3$ and intercalation of nickel oxide), and its transmittance is high. This behaviour, which can be repeated a very large number of times, is bound to the following electrochemical process:

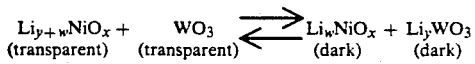

$$Li_{y+w}NiO_x + WO_3 \rightleftharpoons Li_wNiO_x + Li_yWO_3$$
(transparent) (transparent) (dark) (dark)

We claim:

1. An electrode of nickel oxide intercalated with lithium ions, which is prepared by steps of:
   (a) depositing on a conductive glass substrate a thin film of nickel oxide having a nickel to oxygen atomic ratio of from 0.7:1 to 0.9:1 and a thickness of up to 100 nm, the deposition being carried out by thermally evaporating nickel oxide ($Ni_2O_3$); and
   (b) activating said thin film of nickel oxide by electrochemical intercalation of an amount of lithium ions which corresponds to a charge level of from 100 to 1,000 $C/m^2$.

2. An electrode according to claim 1 wherein the depositing step is carried out under a vacuum of approximately $10^{-4}$ Pa, at a temperature of about 2,000° C., and with a peposition rate of the order of 0.1 nm/second.

3. An electrode according to claim 1, wherein the activation by intercalation with lithium is carried out in a cell having a working electrode which is said thin film of nickel oxide deposited on the conductive glass substrate, a counter-electrode which is a thin foil of lithium metal, and an electrolyte which is a solution of lithium perchlorate in propylene carbonate, with a voltage at the working electrode of from an initial value of approximately 3.5 V down to an end value of 1.0-1.2 V and with a current of from 20 mA to 200 $mA/m^2$.

4. An electrochromic device comprising the electrode according to claim 1.

5. An electrochromic device comprising the electrode according to claim 2.

6. An electrochromic window comprising:
   (a) an electrode of tungsten oxide ($WO_3$) which comprises a transparent, conductive glass sheet which has, on its inner face, a layer of tin oxide or tin and indium oxides onto which a layer of tungsten oxide is deposited;
   (b) an electrode of activated nickel oxide which comprises a transparent, conductive glass sheet which has, on its inner face, a layer of tin oxide or tin and indium oxides onto which a thin film of nickel oxide having a nickel to oxygen atomic ratio of from 0.7:1 to 0.9:1 and a thickness of up to 100 nm is deposited by the thermal evaporation of nickel oxide ($Ni_2O_3$) and activated by electrochemical intercalation of an amount of lithium ions which corresponds to a charge level of from 100 to 1,000 $C/m^2$; and
   (c) an electrolyte interposed between said (a) electrode and said (b) electrode.

7. An electrochromic window according to claim 6, wherein for electrode (b) the deposition is carried out under a vacuum of approximately $10^{-4}$ Pa, at a temperature of about 2,000° C., and with a deposition rate of the order of 0.1 nm/second.

8. An electrochromic window according to claim 6, wherein for electrode (b) the activation by intercalation with lithium is carried out in a cell having a working electrode which is said thin film of nickel oxide deposited on the conductive glass substrate, a counter-electrode which is a thin foil of lithium metal, and an electrolyte which is a solution of lithium perchlorate in propylene carbonate, with a voltage at the working electrode of from an initial value of approximately 3.5 V down to an end value of 1.0-1.2 V and with a current of from 20 mA to 200 $mA/m^2$.

9. A process for preparing an electrode of nickel oxide intercalated with lithium ions, which comprises the steps of:
   (a) depositing on a conductive glass substrate a thin film of nickel oxide having a nickel to oxygen atomic ratio of from 0.7:1 to 0.9:1 and a thickness of up to 100 nm, the deposition being carried out by thermally evaporating nickel oxide ($Ni_2O_3$); and
   (b) activating said thin film of nickel oxide by electrochemical intercalation of an amount of lithium ions which corresponds to a charge level of from 100 to 1,000 $C/m^2$.

10. The process of claim 9, wherein the depositing step is carried out under a vacuum of approximately $10^{-4}$ Pa, at a temperature of about 2,000° C., and with a deposition rate of the order of 0.1 nm/second.

11. The process of claim 9, wherein the activation step by intercalation with lithium is carried out in a cell having a working electrode which is said thin film of nickel oxide deposited on the conductive glass substrate, a counter-electrode which is a thin foil of lithium metal, and an electrolyte which is a solution of lithium perchlorate in propylene carbonate, with a voltage at the working electrode of from an initial value of approximately 3.5 V down to an end value of 1.0–1.2 V and with a current of from 20 mA to 200 mA/m$^2$.

* * * * *